Figure 1:
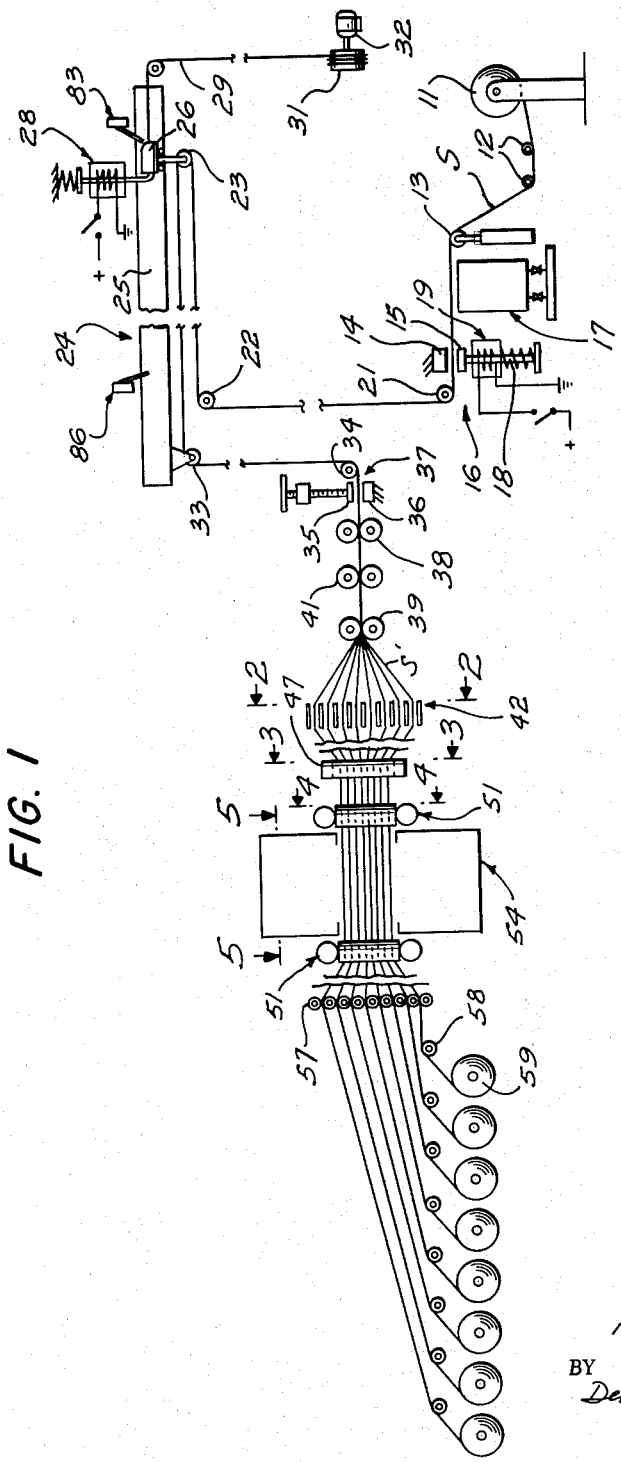

Dec. 10, 1963     I. H. MARANTZ     3,113,882
METHOD AND EQUIPMENT FOR MAKING NARROW GALVANIZED STRIP
Filed Dec. 6, 1961     3 Sheets-Sheet 1

INVENTOR.
ISRAEL H. MARANTZ
BY Dean, Fairbank & Hirsch
ATTORNEYS

Dec. 10, 1963    I. H. MARANTZ    3,113,882
METHOD AND EQUIPMENT FOR MAKING NARROW GALVANIZED STRIP
Filed Dec. 6, 1961    3 Sheets-Sheet 2
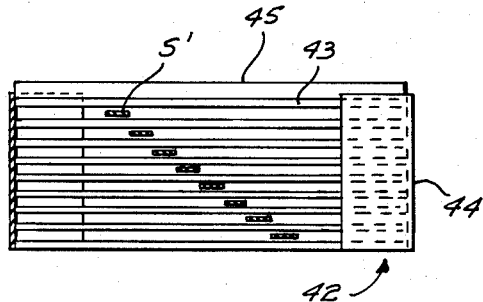
FIG. 2
FIG. 3
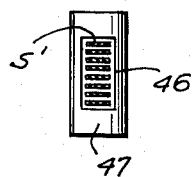
FIG. 4
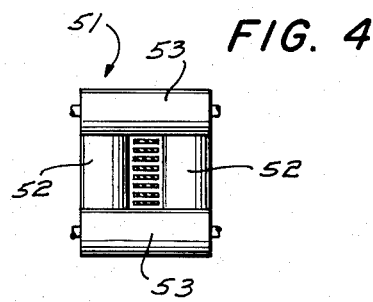
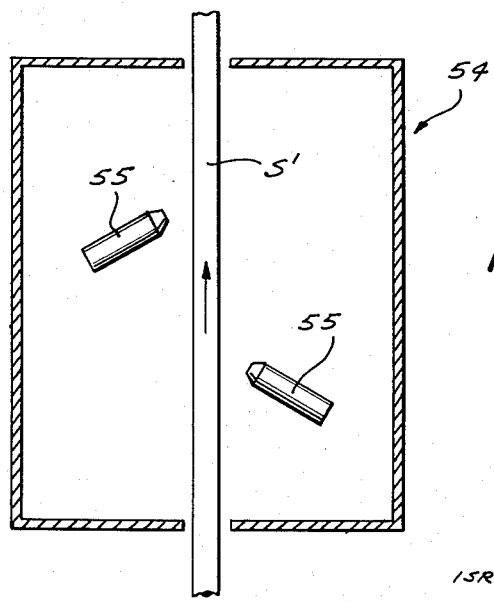
FIG. 5
INVENTOR.
ISRAEL H. MARANTZ
BY
Dean, Fairbank & Hirsch
ATTORNEYS

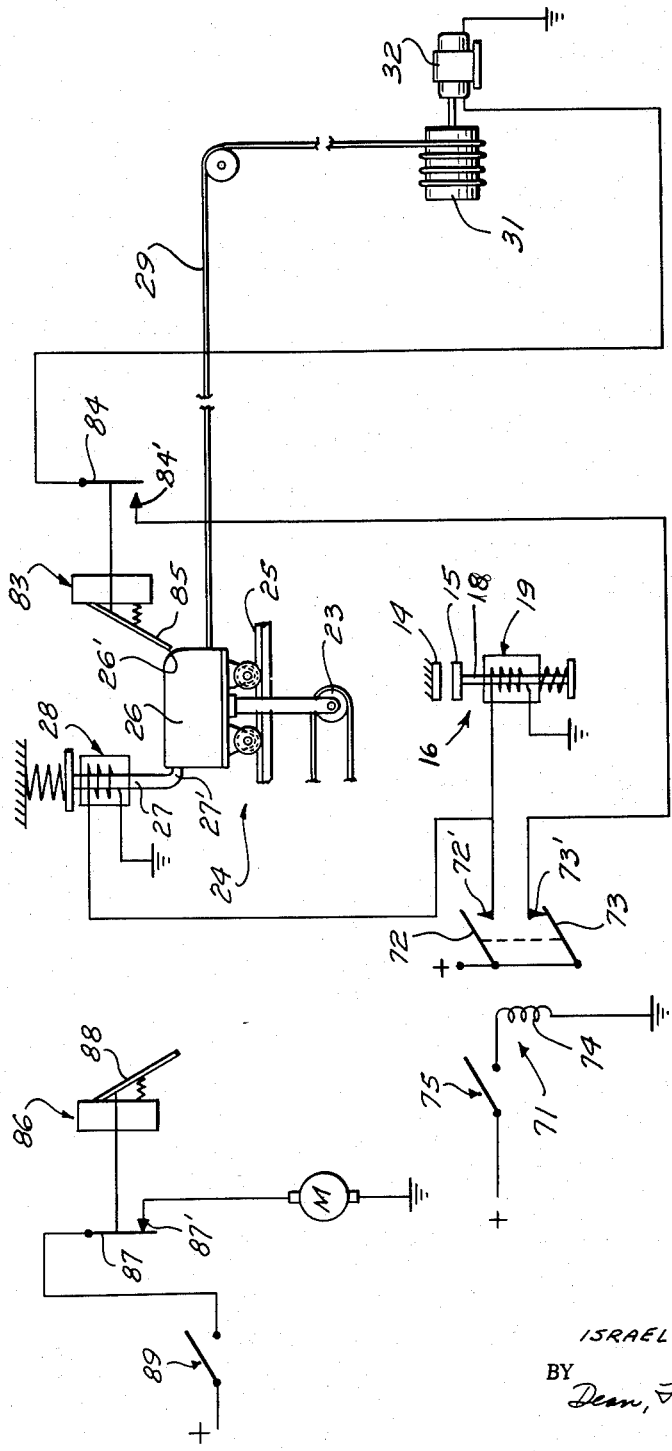

United States Patent Office 3,113,882
Patented Dec. 10, 1963

3,113,882
METHOD AND EQUIPMENT FOR MAKING
NARROW GALVANIZED STRIP
Israel H. Marantz, Forest Hills, N.Y., assignor to Columbia Cable & Electric Corporation, a corporation of New York
Filed Dec. 6, 1961, Ser. No. 157,525
17 Claims. (Cl. 117—4)

This invention relates to manufacture of continuous narrow steel strips having completely galvanized surfaces.

As conducive to an understanding of the invention it is noted that in the manufacture of armored cable, for example, which has a continuous length of steel strip wound around the insulated conductors, to protect such strip from corrosive effect, it is generally completely galvanized as by a zinc coating.

Where the strip is formed from a steel rod that is flattened into a strip of desired width and zinc coated as by electro-galvanizing or by hot dip galvanizing to provide the desired protective coating, the operation is expensive in the case of electro-galvanizing as it requires a relatively large capital investment and is time-consuming in the case of hot dipping which is a batch process not a continuous process.

Where a relatively wide strip of sheet steel, which has been completely galvanized on all surfaces and edges thereof is slit into a plurality of narrow strips of the desired width and the individual narrow strips are then butt welded end to end, as the slitting operation will result in the narrow strips formed having at least one uncoated edge and is most cases two uncoated edges, these edges must then be galvanized which is a time-consuming operation when only the edges of one strip at a time are galvanized.

It is accordingly among the objects of the invention to provide a relatively simple method and correspondingly simple equipment for forming continuous lengths of narrow strips of sheet steel, which are galvanized on all surfaces and edges thereof without resorting to electro-galvanizing with its attendant need for a relatively large capital investment and without resort to the relatively slow batch process of hot dipping, which method and equipment will permit the formation of continuous lengths of narrow strip in a continuous operation and greatly reduce the number of welds to form the continuous strip over the method above set forth and will permit galvanizing of a plurality of narrow strips at a time, thereby greatly minimizing the cost of the finished product.

According to the invention, a wide coil, say 36 to 48 inches in width, of sheet steel which has been galvanized on all surfaces and edges thereof is slit into a plurality of narrow strips say three inches in width and such narrow strips are wound on a reel to form a plurality of master coils.

The strip on each master coil is further slit, longitudinally of its length to form a plurality of narrow strips of the desired final width and the plurality of narrow strips which are initially in side by side relation in the same horizontal plane, are then loosely superimposed to form a vertical stack while the slitting is being performed on the wider strip as it is fed from the master coil.

This vertical stack of narrow strips is continuously fed through a spray booth which has suitable spray guns which, for example, spray heated zinc powder in plastic form onto the edges of the stack of narrow strips as they advance through the spraying booth effectively to zinc coat all of the edges of the strips in the stack in a single operation.

The coated strips as they emerge from the spraying booth are wound respectively on associated take-up reels ready for use.

When the wide strip on the master roll is exhausted, the free end of a wide strip from another master roll is butt welded thereto while the slitting and spraying operation continues.

In the accompanying drawings in which is shown one of various possible embodiments of the several features of the invention, FIG. 1 is a diagrammatic side elevational view of the equipment,
FIG. 2 is a view taken along line 2—2 of FIG. 1,
FIG. 3 is a view taken along line 3—3 of FIG. 1,
FIG. 4 is a view taken along line 4—4 of FIG. 1,
FIG. 5 is a view taken along line 5—5 of FIG. 1, and
FIG. 6 is a circuit diagram of a control circuit for the equipment.

Referring now to the drawings, as diagrammatically shown, the equipment comprises a support for a master reel on which a considerable length of galvanized steel strip S, illustratively three inches in width, it wound to form a master coil 11.

As the master coils have been formed by slitting a wide continuous length of galvanized sheet steel, it is apparent that at least one and in most cases both of the edges of the strip S on the master coil will have no coating thereon.

The strip S passes beneath guide rollers 12 and over guide roller 13 and then between the spaced plates 14, 15 of a clamping device 16, the latter being spaced sufficiently from the guide roller 13 to permit positioning of a butt welding unit 17 therebetween.

As illustratively shown, the plate 14 of the clamping device 16 is fixed and the plate 15 is carried by the plunger 18 of a solenoid 19, said plunger being normally spring urged to retracted position so that plates 14 and 15 are separated to permit free movement of the strip S therebetween.

The strip S then passes around guide rollers 21, 22 and around roller 23 of a looping device 24. The looping device may be of any suitable type and illustratively comprises an elongated track 25 which may be of any suitable length, say 300 feet and which mounts a movable trolley 26 from which depends the roller 23.

The trolley has a locking device, illustratively a plunger 27 movable into the path of the trolley 26 and positioned adjacent one end of the track 25, said plunger illustratively being part of a solenoid 28 and normally spring urged downwardly into locked position to restrain movement of the trolley 26.

A cable 29 is connected at one end to the trolley 26 and at its other end to a drum 31 mounted on the shaft of a motor 32. When the motor is de-energized the drum may rotate freely to permit movement of the trolley 26 to the left along the track 25 and when the motor 32 is energized the trolley will be moved to the right.

The strip S which passes around roller 23 carried by the trolley 26 also passes around a roller 33 secured in fixed position to the other end of the track and then passes around guide roller 34 and between the plates 35, 36 of a shaving device 37.

The shaving device 37 may be screw-operated and is normally in position with its plates 35 and 36 spaced from each other.

The strip S then passes between two pairs of longitudinally spaced spring loaded pinch rollers 38, 39 between which is positioned slitting rollers 41, said strip passing between said slitting rollers which form say eight narrow strips S', each ⅜ of an inch wide. The rollers 38, 39, 41 desirably are driven in timed relation by a suitable drive motor diagrammatically illustrated at M in FIG. 6.

The plurality of narrow strips S' pass between a spacer assembly 42 which may comprise a vertical stack of narrow plates 43, one strip being positioned between each adjacent pair of plates 43 with the strips S' being in side by side relation, staggered vertically as shown so that they are in different planes, as shown in FIG. 2.

The stack of plates 43 are mounted in a holder 44 which may comprise a pair of vertical channel members which have a removable cover plate 45 secured to the top thereof, the distance between the cover plate 45 and the bottom of the holder 44 being such that the plates 43 and the strips S' will be free to move vertically yet excessive vertical movement is prevented.

The strips S' are then superimposed to form a vertical stack. This is accomplished by feeding the strips S' through a vertical slot 46 in a bar 47 which is say, 6 or 8 feet from the spacer assembly 42 so that no undue bending or kinking of the strips will occur due to such superimposition. The slot 46 is of width greater than the width of an individual strip S' and less than twice the width of the strip S' so that a range of strips may be accommodated.

The vertical stack of strips S' then pass through a pair of spaced guide assemblies 51, each desirably comprising a pair of vertical rollers 52 spaced so as to accommodate the vertical stack of strips S' with but little transverse clearance and a pair of horizontal rollers 53 which are spaced by an amount slightly greater than the height of the stack so that the strips S' will not press tightly against each other.

Interposed between the guide assemblies 51 is a spraying booth 54 through which the vertical stack of juxtaposed strips S' will pass. The spraying booth is provided with a plurality of spray guns 55, illustratively zinc spray guns, such as of the "Schori" type, which guns are positioned on both sides of the vertical stack of strips S' so that the zinc spray will coat both of the side edges of the strips S'. As the strips S' are only loosely pressed against each other, the spray will also coat the surfaces of the strips S' adjacent the edges thereof to provide a firm bond of the zinc coating on the edge of the strip S'.

The individual strips S' of the stack of coated strips, after it emerges from the spraying booth and the associated guide assembly 51 then passes respectively between adjacent pairs of horizontal rollers 57 arranged in a vertical row, and from these rollers 57 the strips S' pass respectively over an associated guide roller 58 onto an associated take-up reel 59 driven in suitable manner to exert tension on the individual strips, said reels having conventional means to move the strips S' back and forth on the associated reel as it is being wound to form a uniform roll of strip.

Although the equipment can be operated manually, in the embodiment herein shown, an automatic control circuit is provided as diagrammatically shown in FIG. 6.

The control circuit illustratively comprises a master relay 71 which has a pair of contact arms 72, 73 connected to one side of a source of potential, illustratively, positive D.C. Contact arm 72 is spaced from fixed contact 72' and contact arm 73 engages fixed contact 73', when the coil 74 of relay 71 is not energized.

One side of coil 74 is connected to ground and the other to a normally open switch 75 which controls the circuit from the positive main to said coil 74.

Fixed contact 72' is connected to one end of the coils of solenoids 19 and 28, the other ends of which are connected to ground.

Associated with the track near one end thereof is a micro-switch 83 which has a contact arm 84 and a fixed contact 84'. The micro-switch 83 has an actuating arm 85 in the path of movement of trolley 26 and spring urged so that when not engaged by the trolley 26, contact arm 84 is spaced from contact 84'.

The contact arm 84 is connected to one side of motor 32, the other side of which is connected to ground and contact 84' is connected to fixed contact 73' of relay 71.

A second micro-switch 86 is associated with track 25 at the other end thereof. Micro-switch 86 has a contact arm 87 and a fixed contact 87'. The micro-switch 86 has an actuating arm 88 in the path of movement of trolley 26 and spring urged so that when not engaged by the trolley 26 contact arm 87 engages fixed contact 87'. Contact arm 87 is connected through normally open start switch 89 to positive main, and contact 87' is connected to one side of the drive motors M for the take-up reels 59 and the pinch rollers and slitter 38, 39, 41, the other side of said motors M being connected to ground.

Assuming that start switch 89 is closed and switch 75 is open and the equipment has been operating to wind the narrow strips S' onto the take-up reels 59, since switch 75 is open, solenoids 19 and 28 are not energized. As a result, the clamp plates 14, 15 are spaced to permit free movement of strip S therebetween and locking plunger 27 is in its downward position restraining movement of trolley 26 and retaining the latter against actuating arm 85 of microswitch 83 so that contacts 84, 84' are spaced. As a result, motor 32 is de-energized.

When the supply of strip S from the master roll 11 is exhausted and before the free end of the strip has come off the reel containing the master roll, the operator closes switch 75.

As a result, relay 71 will be energized to cause contacts 73, 73' to open and contacts 72, 72' to close. Closing of these latter contacts will complete circuits to and energize solenoids 19 and 28. Energization of solenoid 19 will cause plate 15 to move toward plate 14 clamping the strip S therebetween and restraining further movement thereof.

Energization of solenoid 28 will cause locking plunger 27 to be moved out of the path of trolley 26 so that the latter is free to move along the track 25. Consequently, as the take-up reels and slitter and pinch rollers rotate to advance the strip S and to form the strips S', even though no strip is being fed from the master coil 11, the strip contained in the loop will continue to feed, the loop thus getting shorter and shorter. As a result, the slitting, spraying and take-up action will continue. Since the motor 32 is not energized, the drum 31 is free to turn to release the cable 29 as the trolley moves to the left.

At this time, the operator cuts the strip S between the clamp assembly 16 and the guide roller 13. After replacing the empty master roll 11 with a full master roll 11, he positions such cut end of strip S and the free end of the strip on the full roll on the butt end welding device 17 so that the two ends are in engagement and then welds such ends.

The cutting of the strip S, the replacement of the master roll and the welding operation take but a relatively short time and may readily be completed before the trolley has advanced any considerable distance along the track so that the supply of strip S to be slit is uninterrupted.

After the welding operation is finished, the operator rotates the screw of the scraping device 37 to move plate 35 thereof toward plate 36 so that the clearance therebetween is merely sufficient to permit the strip S to pass therebetween. Thereupon the operator opens switch 75.

As a result, relay 71 is de-energized so that contacts 72, 72' open and contacts 73, 73' close. Opening of contacts 72, 72' causes solenoids 19 and 27 to be de-energized. As a result, of the de-energization of solenoid 19, plate 15 will move away from plate 14 to release the strip S so that it may again be advanced and drawn from the new master roll.

As a result of the de-energization of solenoid 28, the plunger 27 will move downwardly in the path of trolley 26. However, the trolley at this time is to the left of the plunger 27.

Since the movement of trolley 26 away from microswitch 83 permitted contacts 84, 84' to close and since the de-energization of relay 71 permitted contacts 73, 73' to close, a circuit is completed to motor 32 to energize the latter.

As a result, the shaft of motor 32 and the drum 31 thereon which have been turning idly under the tension of cable 29 will now positively rotate in the opposite direction to exert tension on cable 29 to move trolley 26 to the right. When the trolley reaches the plunger 27, which is now in its down position, the leading curved edge 26' of the trolley will cam upwardly the lower curved end 27' of plunger 27 and such end 27' will ride over the top of the trolley. Thereupon the plunger will be spring urged downwardly to prevent movement of the trolley to the left at substantially the same time as the trolley engages actuating arm 85 and opens contacts 84, 84' to break the circuit to motor 32.

At this time, the equipment is ready for the next cycle, i.e., the replacement of another master coil after the previous one has been exhausted.

After the switch 75 was actuated to release the clamping assembly 16, the movement of the strip would bring the weld junction beneath the scraper 37 and as a result the excess portion of the weld would be removed. Thereupon the operator need merely open the scraper plates and the operation continues.

In the remote event the operator for some reason should not complete the welding operation within a reasonable period of time and the trolley has moved to the extreme left end of track 25, the equipment would automatically stop. This is due to the fact that when the trolley abutted against actuating arm 83, it would open contacts 87, 87' to break the circuit to the drive motors M.

Restart of the equipment after the weld has been completed would occur automatically when switch 75 is opened by the operator.

With the method and equipment above described, narrow strips which are completely galvanized may readily be formed in a continuous operation without any interruption due to the need to replenish the supply of wide strips from which the narrow strips are formed.

As the welding operation connects the wider strips S rather than the narrow strips S', it is apparent that less welding operations must be performed which materially reduces the cost of the product.

As many changes could be made in the above method and equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. The method of forming narrow strips of steel from a wider completely galvanized strip thereof which comprises the steps of positively feeding such wider strip from a supply roll thereof, longitudinally slitting such wider strip as it is advanced to form a plurality of narrow strips in side by side relation in the same plane, superimposing such plurality of narrow strips as they are advanced to form a stack, spraying a galvanizing coating on the side edges of the strips in such stack and thereupon winding the individual strips onto an associated reel.

2. The method set forth in claim 1 in which the strips in the stack are free to move toward and away from each other slightly as they are being sprayed to permit at least portions of the top and bottom surfaces of the strips adjacent their edges also to be coated.

3. The method set forth in claim 1 in which an elongated loop of the wider strip is formed between the supply roll thereof and the slitting operation, and is normally restrained from shortening, thereupon when the supply roll is substantially exhausted, the end of the strip adjacent the supply roll is restrained from movement and the loop of strip is permitted to shorten to supply strip for the slitting, coating and winding operations, thereupon the restrained end of the strip is severed and butt welded to the free end of a wide strip from another supply roll, and the restrained end of the first strip is then released.

4. The method set forth in claim 3 in which the loop is again elongated after the strip has been released.

5. The method set forth in claim 1 in which the narrow strips are vertically spaced from each other as they are advanced and before they are superimposed to form the stack, the strips in the stack thereby being free to move toward and away from each other slightly as they are being sprayed to permit at least portions of the top and bottom surfaces of the strips adjacent their edges also to be coated.

6. Equipment for forming narrow strips of steel from a wider strip and coating all the edges of such narrow strip, comprising means to feed such wide strip, means to slit such strip to form narrower strips in side by side relation and extending longitudinally of such wider strip as the latter is advanced, means to arrange said narrow strips each in a different plane that is parallel to the path of movement thereof, thereby to expose the opposed edges of each narrow strip and means to spray a coating on the exposed edges of said strips.

7. The combination set forth in claim 6 in which means are provided to form a substantially superimposed stack of such narrow strips, said stack extending in a plane perpendicular to the path of movement of said superimposed strips.

8. The combination set forth in claim 6 in which the arranging means retains the strips in side by side relation in different planes and means are provided to form a substantially superimposed stack of such narrow strips, said stack extending in a plane perpendicular to the path of movement of said superimposed strips.

9. Equipment for forming narrow strips from a wider strip and coating all the edges of such narrow strips, comprising means to feed such wider strip, means to slit such strip to form narrow strips in side by side relation and extending longitudinally of such wider strip as the latter is advanced, means to arrange said narrow strips in side by side relation each in a different plane that is parallel to the path of movement thereof with adjacent strips being slightly spaced from each other, thereby to expose the opposed edges of each narrow strip, means to form a substantially superimposed stack of such narrow strips extending in a plane perpendicular to the path of movement of such superimposed strips and means to apply a coating to the exposed edges of said strips.

10. The combination set forth in claim 9 in which a take-up reel is provided for each of said narrow strips.

11. Equipment for forming narrow strips from a wider strip mounted on a reel and coating all of the edges of such narrow strips, comprising a support for said reel, a normally open clamping device through which the strip from the reel extends, a slitting device through which the strip extends after it leaves the clamping device, said slitting device comprising means to slit said wide strip into a plurality of narrow strips, means to form a stack of superimposed narrow strips extending in a plane perpendicular to the path of movement of said strips after they have been formed, a spray booth having a plurality of spray guns directed substantially toward each other, means to guide such stack through said booth between said spray guns for coating of the edges of the strips in said stack, a plurality of take-up reels, means to guide the plurality of strips after they emerge from the spray booth onto an associated take-up reel and means to rotate said take-up reels to effect movement of said strip.

12. The combination set forth in claim 11 in which means are provided to form an elongated loop in such wide strip between the clamping means and the slitting means, means to actuate said clamping means to restrain movement of the associated end of the strip and substantially simultaneously to permit reduction in the length of said loop as the narrow strips are wound on said take-up reels.

13. The combination set forth in claim 11 in which means are provided to form an elongated loop in such wide strip between the clamping means and the slitting means, said looping means comprising an elongated track extending parallel to and longitudinal of the path of movement of the strip, a trolley movable along the track, a guide roller carried by said trolley, means releasably to retain the trolley at one end of the track, a guide roller at the other end of the track, said clamping means being positioned beneath the track between the ends thereof, means to guide the wide strip from the clamping means around said guide rollers to said slitting means to form an elongated loop, and means to actuate said clamping means to retrain movement of the associated end of the strip and substantially simultaneously to release the trolley whereby upon continued advance of the strip, the trolley will move along the length of the track to effect reduction in the length of said loop.

14. The combination set forth in claim 13 in which means are provided when said clamping means is deactuated and said strip released, to effect movement of the trolley back to its locked position thereby to elongate the loop.

15. The combination set forth in claim 13 in which a welding means is provided between said clamping means and said feed reel, whereby when said clamping means is actuated, the free end of a strip on another reel can be welded to the end of the first strip.

16. The combination set forth in claim 13 in which means are provided between said clamping means and said slitting means to scrape excess welding material from the welded junction of said strips.

17. The combination set forth in claim 11 in which a rigid member is positioned between said spraying booth and said slitting means, said member having a vertical slot therethrough of width slightly greater than the maximum width of the narrow strip and of height slightly greater than the height of a superimposed stack of such strips to permit slight vertical movement therebetween, and a spacer assembly is positioned between said slotted member and said slitter, said spacer assembly comprising a plurality of horizontal spacer members, said plurality of strips extending respectively between adjacent vertical pairs of said spacer members and then through said slot to form said stack.

References Cited in the file of this patent
UNITED STATES PATENTS

| | | |
|---|---|---|
| 2,000,226 | Fry | May 7, 1935 |
| 2,360,247 | MacChesney | Oct. 10, 1944 |
| 2,649,131 | Lincoln | Aug. 18, 1953 |